June 21, 1960 V. H. CARR ET AL 2,942,049
ELECTRODE GUIDE
Filed Feb. 19, 1959
2 Sheets-Sheet 1

INVENTORS
Victor H. Carr
Clayton E. Frogge
David J. Klee
BY M. W. Goodwin
Their Attorney June 21, 1960     V. H. CARR ET AL     2,942,049
ELECTRODE GUIDE
Filed Feb. 19, 1959                      2 Sheets-Sheet 2
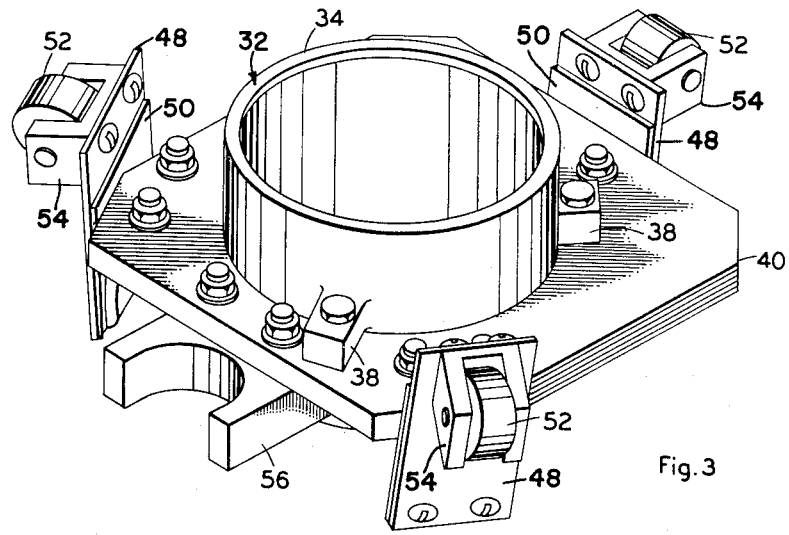
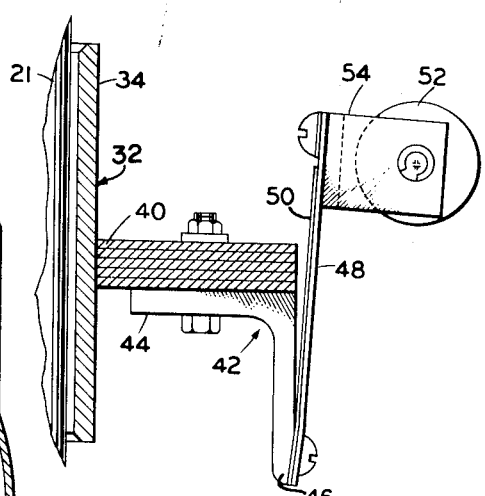
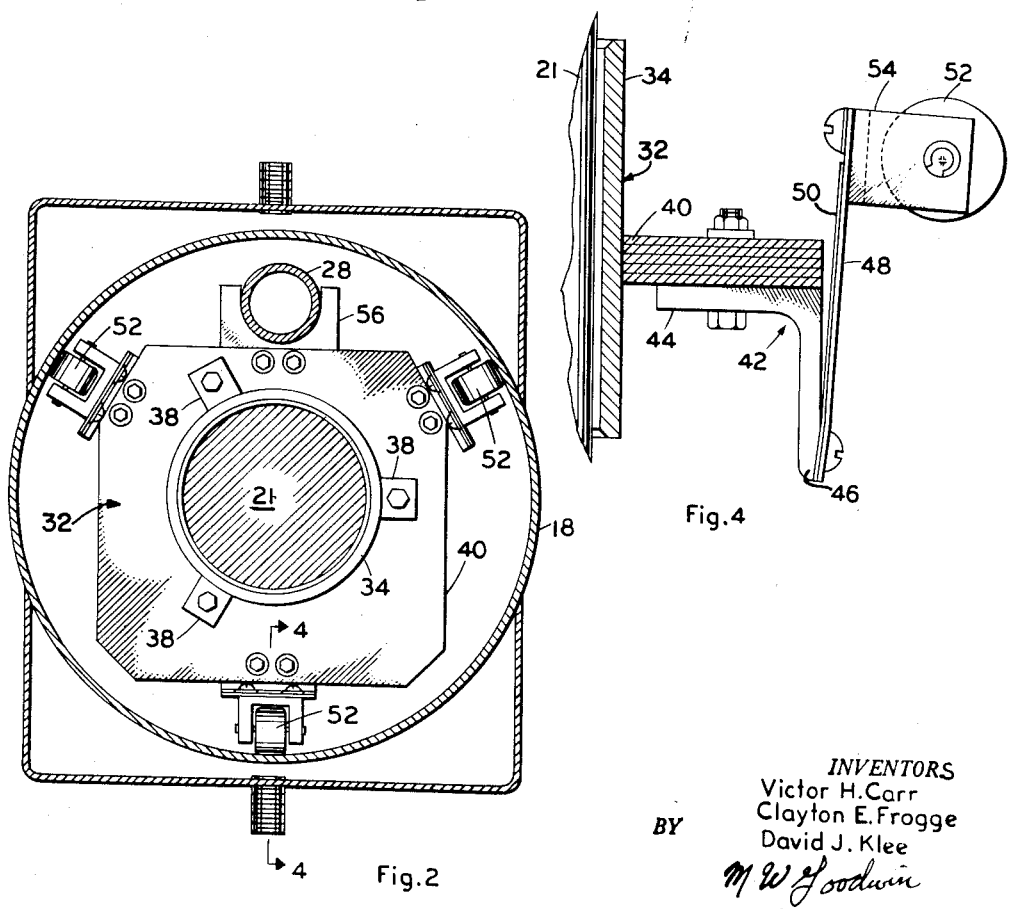
*INVENTORS*
Victor H. Carr
Clayton E. Frogge
David J. Klee
BY *M W Goodwin*
Their Attorney

United States Patent Office 2,942,049
Patented June 21, 1960

2,942,049
ELECTRODE GUIDE

Victor H. Carr, Clayton E. Frogge, and David J. Klee, Shelbyville, Ind., assignors to General Electric Company, a corporation of New York Filed Feb. 19, 1959, Ser. No. 794,359

5 Claims. (Cl. 13—17)

This invention relates to an electric arc furnace of the consumable electrode type and, more particularly, to a novel and improved means for guiding a consumable electrode of such a furnace during furnace operation.

Electric arc furnaces of the consumable electrode type often comprise a vertically arranged crucible and a furnace housing including an elongated electrode housing extending upwardly of and in vertical alignment with the crucible. An electrode is supported within the furnace housing for vertical movement relative to the crucible. In the operation of the furnace, an arc is struck between the lower end of the electrode and metal on the bottom of the crucible, whereupon the heat of the arc will melt the electrode which is fabricated from the metal it is desired to melt. As the electrode is consumed, it is advanced or lowered to maintain the arc.

In such a furnace, it is necessary to guide the electrode during its advance in order to keep the electrode generally centered in the electrode housing and crucible. The centering of the electrode is necessary inasmuch as if the electrode were to move sufficiently close to the crucible side walls an arc might be struck between the electrode and crucible side wall, which could result in a burn through of the crucible and possibly an explosion. Likewise, if the electrode were to move sufficiently close to the electrode housing or other enclosing structure of the furnace housing, the resulting arc could damage the furnace.

Previously used electrode guides for furnaces of this type generally have comprised guide means fixed in the furnace housing and directly engaging the electrode. Such guide means, which could be sliding shoes, rolls, etc., often have to be changed with every change in electrode diameter or cross sectional configuration. Further, such guides may mechanically jam the electrode or conceivably may cause an electrical short circuit between the electrode and furnace housing which might result in failure of the furnace.

Accordingly, it is the object of this invention to provide a novel and improved means for guiding an electrode in a furnace of the type described which will not require replacement or adjustment of any components with changes in electrode diameter and cross section configuration, which will provide accurate centering of the electrode in the furnace, which will substantially eliminate mechanical jamming of the electrode or electrical shorting of the electrode to surrounding structure, and which will be rugged and dependable so as to provide an extended trouble-free service life.

Other advantages as well as the details of the present invention will be apparent from the following description taken in connection with the accompanying drawings, in which:

Fig. 2 is an enlarged cross sectional view substantially along the line 2—2 of Fig. 1;

Fig. 3 is a perspective view of the electrode guide means of this invention; and Fig. 4 is an enlarged cross sectional view substantially along the line 4—4 of Fig. 2.

Figure 1:
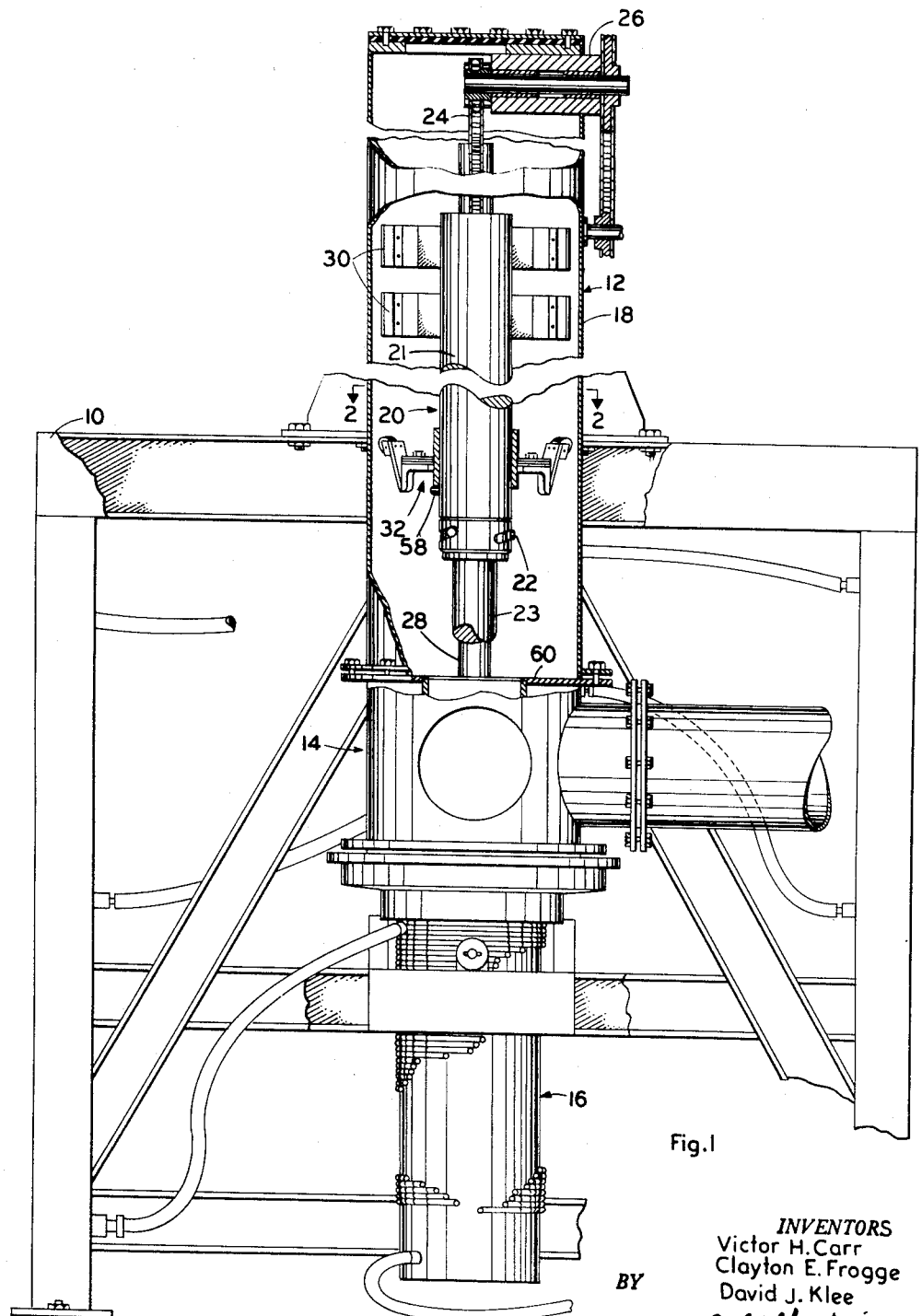
Fig. 1 is a fragmentary elevational view, partly in section, of an exemplary electric arc furnace incorporating electrode guide means of the present invention.

With reference to the drawings, and particularly Fig. 1, there is shown an electric arc furnace of a type with which this invention is concerned. Such a furnace generally comprises a supporting frame structure 10 on which is mounted a furnace housing including a vertically extending electrode housing 12 and furnace body portion 14 secured to the lower end of the electrode housing 12. A water cooled crucible 16 depends from the lower end of the body 14. The electrode housing 12 comprises an elongated metal cylinder 18 containing an electrode support and current collector assembly 20 extending generally coaxially within the cylinder 18. The assembly 20 comprises an electrode extension 21 including an elongated cylindrical member having an electrode clamp 22 at its lower end for supporting a depending electrode 23. The electrode extension 21 is suspended within the electrode housing by a chain 24 engaged about a sprocket drive 26 extending outwardly of the cylinder 18 and adapted to be driven by suitable drive means (not shown) such as an electric drive motor. The free end of the chain 24 is conveniently located in a tubular member or pipe 28 extending parallel to and laterally spaced from the electrode extension 21 and secured at its top and bottom ends to the furnace housing. The electrode extension carries at its upper end a pair of current collectors 30 which are slidably engageable with the inner surface of the cylinder 18 and also which are electrically connected to the electrode 23. The current collector portion of the assembly 20 forms no part of this invention but rather forms an invention described and claimed in a copending application Serial No. 802,785, filed March 30, 1959 in the name of David J. Klee.

In the operation of a furnace of the type described, an external electrical power source is connected to the cylinder 18 and to the crucible 16, which is electrically insulated from the cylinder 18. Current may then flow through the cylinder 18 and current collector 30 to the electrode 23, whereby an arc may be struck by the electrode and a quantity of scrap material in the bottom of a crucible 16. The heat of this arc will melt the tip region of the electrode, and the electrode will be advanced as it is melted in order to maintain the arc.

In order to center the electrode 23 within the cylinder 18 during the electrode advance, there is provided in accordance with the invention a novel and improved electrode guide 32 which, as shown in Figs. 1 through 4, comprises a cylindrical collar-like member 34 telescopically surrounding the electrode extension 21 for movement longitudinally thereof. The collar 34, as most clearly shown in Figs. 2 and 3, is provided with a plurality of integral radially outwardly extending ears or lugs 38 which are secured to a base or supporting member 40 which, as most clearly seen in Fig. 4, comprises a plurality of stacked laminates of electrically insulating material, with the laminated base 40 having a central aperture in which the collar 34 is coaxially received.

A plurality of L-shaped brackets 42, which may be fabricated from a piece of angle iron, are secured to the peripheral portion of the base 40 and spaced angularly about the longitudinal axis of the collar 34. As shown in Fig. 4, these brackets each comprise a pair of legs 44, 46, with the leg 44 being secured to the under side of the base 40 and with the leg 46 depending at right angles to the base 40. At the lower end of the leg 46 is secured the bottom end of a pair of overlying resilient plates 48, 50, preferably of spring steel, extending upwardly and angularly outwardly from the lower end of the bracket leg 46. The upper end of each inner plate 50 terminates short of the upper end of the respectively associated outer plate 48, and a roller 52 is disposed on the side of each pair of leaves 48, 50 opposite the collar 34. Each roller is carried by a bifurcated support 54 secured to a leaf 48 on the upper portion of the leaf which projects beyond the associated inner leaf 50. It should be noted that the heads of the screws securing the roller supports 54 to the leaves 48 are spaced from the upper ends of the inner leaves 50 so as to permit relative sliding movement of the sandwiched leaves 48, 50 as they are simultaneously flexed either radially inwardly or outwardly of the collar 34. A yoke 56 is, as most clearly shown in Figs. 2 and 3, secured to the under side of the base 40 and extends generally radially outwardly of the collar 34. The yoke 56, as is shown in Fig. 2, is adapted to be slidably engaged about the chain housing pipe 28, previously described, so as to limit angular movement of the base 40 and this guide 32 about the axis of cylinder 18.

As shown in Figs. 1 and 2, with the guide 32 installed on the electrode extension 21 and assembled within the cylinder 18, the rollers 52 will engage the inner surface of the cylinder 18 in rolling contact so as to resiliently center the electrode extension 21 within the cylinder. For a reason hereinafter described, the collar 34 is preferably slidably mounted on the electrode extension 21. As shown in Fig. 1, a pin 58 extends radially outwardly from the electrode extension 21 and is engageable with the bottom of the collar 34 to limit movement of the collar relative to the electrode extension and toward the electrode. As the electrode is advanced during the melting operation, the bottom ends of the legs 46 of the brackets 42 will engage a radially extending shelf 60 in the interior of the furnace housing to preclude further downward movement of the guide means 32, whereby the electrode extension will then be lowered relative to the collar 34 to finish the melting operation. When the electrode extension is subsequently raised, the weight of the guide 32 causes the guide to remain on the shelf 60 until the collar 34 is picked up by the pin 58 on the electrode guide.

The electrode is thus centered and guided in its vertical travel by the electrode guide 32 of this invention and also, as will be apparent from Fig. 1, by the current collectors 30 which resiliently and slidably engage the inner surface of the cylinder 18. The reduction of the distance between the electrode guide 32 and the current collectors 30 which occurs when the electrode extension is lowered relative to the electrode guide, as heretofore described, would seem to reduce the centering effect of the combination of the electrode guide and current collectors. However, it must be realized that this relative movement of the electrode extension and guide 32 occurs only during the final portion of a melt, at which time the electrode has been almost fully consumed so that its length is very substantially less than its original length. Accordingly, there is little if any reduction in electrode centering ability as reflected at the tip of the electrode.

The resilient mounting of the rollers 52 permits the rollers to ride over any imperfections or out-of-roundness in the inner surface of the cylinder 18, thus permitting the guide assembly to be used with a cylinder or pipe substantially in an as-received condition. In other words, the necessity for machining of the inner surface of the pipe is substantially eliminated. The specific spring arrangement described for mounting the rollers offers the advantage of providing a relatively high deflection versus load characteristic, which is desirable in order to provide relatively high resilient centering forces on the electrode extension while at the same time permitting deflection of the roller over imperfections and the like on the inner surface of the electrode housing without seriously adversely affecting the centering of the electrode. The use of rollers rather than a sliding contact materially reduces the frictional resistance to movement of the electrode guide, particularly in the case of unmachined or rough surfaces. In a specific embodiment wherein the force of each spring assembly was approximately fifty pounds it was found that the use of rollers assured that the guide assembly 32 would drop of its own weight as the electrode extension was being moved downwardly from a starting position so that the collar 34 would remain resting on the pin 58. With a sliding or wiping type contact and a corresponding spring force, the frictional resistance between the contacts and inner wall of the electrode housing probably would be sufficient to preclude the electrode guide 32 from falling of its own weight so that the electrode extension would be prematurely advanced or lowered relative to the collar 34.

The mounting of the rollers on an insulated support which, in turn, is mounted on the guide collar 34 assures that the rollers will be electrically insulated from the current carrying electrode extension. This is desirable in order to avoid any current flow through the rollers which might tend to burn the same or possibly cause them to weld to the furnace housing. The electrode guide of this invention offers the particular advantage of being engageable with the electrode extension rather than the electrode itself, which obviates the necessity for adjusting or changing the electrode guide with each change of electrode diameter or cross sectional configuration. Rather, the electrode extension need only be provided with suitable electrode clamping means adapted for use with varying sizes and shapes of electrodes. The collar 34 is, as has been mentioned, preferably slidable over the electrode extension and is, therefore, preferably dimensioned to provide that at furnace operating temperature the collar will be slightly larger in diameter than the electrode extension. Inasmuch as no current passes through the collar 34, the collar will during furnace operation remain relatively cool as compared to the electrode extension. Therefore, the collar 34 will have lesser temperature-caused expansion than will be electrode extension, which factor must be taken into account in the proper selection of the collar inner diameter. As will be apparent from the foregoing, the guiding of the electrode extension rather than the electrode itself also substantially eliminates the possibility of any jamming between the electrode and the guide means during advance of the electrode. The advance of the guide means along with the electrode extension during the majority of its travel will, of course, eliminate any possibility of mechanical jamming during this period, and the proper selection of the inner diameter of the collar 34 will preclude any jamming between the collar and electrode extension during advance of the extension relative to the collar during the final stage of the melt.

While the invention has been shown and described in terms of a preferred embodiment, it, of course, will be understood by those skilled in the art that various changes and modifications to the specific structure disclosed may be made without departing from the present invention. It might be particularly noted in this connection that it is not intended that the cylindrical cross sectional shape of the electrode extension and guide collar 34 is to be taken as critical. Accordingly, the foregoing description and drawings are to be taken only in an illustrative sense, and it is intended that the invention is to be limited only by the appended claims, which shall include within their scope all structure which logically falls within the language of these claims.

What we claim as new and desire to secure by Letters Patent of the United States is:

1. In an electric arc furnace of the type having a vertically arranged furnace housing, an electrode extension extending longitudinally of and disposed at least partially within said housing and having means at one end for suspending an electrode, and means supporting the electrode extension for vertical movement relative to said housing; electrode guide means comprising a guide member telescopically receiving a portion of the electrode extension, said guide member being movable longitudinally of and relative to the electrode extension and said guide member being engageable with the electrode extension to tend to maintain the extension centered in the guide member, and means mounted for movement with the guide member and engageable with means internally of the furnace housing to tend to maintain the guide member centered in the furnace housing during vertical movement of the electrode extension relative to the furnace housing, the electrode extension carrying means engageable with said guide means to vertically support the guide means in a predetermined position longitudinally of the electrode extension, and means on the furnace housing engageable with said guide means during lowering of the electrode extension to arrest movement of the guide means with the electrode extension so that during subsequent lowering of the electrode extension the extension will be moved relative to and through said guide member.

2. In an electric arc furnace of the type having a vertically arranged furnace housing including an elongated electrode housing, an electrode extension extending longitudinally of and disposed at least partially within said electrode housing and having means at one end for suspending an electrode, and means supporting the electrode extension for vertical movement relative to said furnace housing; an electrode guide comprising a guide member having a bore telescopically receiving a portion of said electrode extension, a base member of electrically insulating material secured to the guide member for movement therewith, a plurality of rollers spaced angularly about the axis of said bore and engageable in rolling contact with means internally of the electrode housing during vertical movement of the electrode extension, and spring means mounting each of the rollers on the base member for movement therewith and for movement relative thereto and generally laterally of said electrode extension.

3. In an electric arc furnace of the type having a vertically arranged furnace housing including an elongated electrode housing, an electrode extension extending longitudinally of and disposed at least partially within said electrode housing and having means at one end for suspending an electrode, and means supporting the electrode extension for vertical movement relative to said furnace housing; an electrode guide comprising a collar having a bore telescopically receiving a portion of said electrode extension, a base member of electrically insulating material secured to the collar for movement therewith, a plurality of rollers spaced angularly about the axis of said bore and engageable in rolling contact with means internally of the electrode housing during vertical movement of the electrode extension, spring means mounting each of the rollers on the base member for movement therewith for movement relative thereto and generally laterally of said electrode extension, and a yoke member mounted for movement with said base member, and a guide member extending longitudinally of and within the electrode housing, the yoke member slidably embracing said guide member to limit angular movement of said collar about the longitudinal axis of said electrode housing.

4. An electrode guide for an electric arc furnace comprising a collar having a bore for telescopically receiving an electrode extension, a base member of electrically insulating material secured to the collar for movement therewith, a plurality of rollers spaced angularly about the axis of the collar with their axes extending at right angles to the collar axis and to radii of the collar axis, and means resiliently mounting each of the rollers on the base member for movement therewith and for movement radially of and relative to the collar including a leaf spring disposed between the roller and collar and extending generally in the direction of the collar axis, means securing one end of each spring to the base member for flexure of the other free end of the spring generally radially of the collar axis, and means mounting the rollers respectively on the free ends of the springs.

5. An electrode guide for an electric arc furnace comprising a collar having a bore for telescopically receiving an electrode extension, a base member of electrically insulating material secured to the collar for movement therewith, a plurality of rollers spaced angularly about the axis of the collar with their axes extending at right angles to the collar axis and to radii of the collar axis, and means rotatably mounting each of the rollers on the base member for movement therewith including a pair of sandwiched flat leaf springs disposed between the roller and collar and extending generally in the direction of the collar axis, means securing one end of each of the pair of springs to the base member for flexure of the springs generally radially of the collar axis, the springs of each pair thereof being secured together only at said one end thereof so that on simultaneous flexure of the springs of each pair the inner spring next adjacent the collar will be moved in sliding contact relative to the outer spring, and means mounting the rollers respectively on the outer springs of said pairs of springs.

References Cited in the file of this patent

UNITED STATES PATENTS

| | | |
|---|---|---|
| 618,703 | Maxim | Jan. 31, 1899 |
| 1,972,849 | Wisdom | Sept. 4, 1934 |
| 2,640,860 | Herres | June 2, 1953 |
| 2,662,104 | Southern | Dec. 8, 1953 |
| 2,857,445 | Mangin | Oct. 31, 1958 |

FOREIGN PATENTS

| | | |
|---|---|---|
| 101,650 | Austria | Nov. 10, 1925 |